United States Patent
Humphris

(10) Patent No.: US 9,921,240 B2
(45) Date of Patent: Mar. 20, 2018

(54) PROBE ACTUATION SYSTEM WITH FEEDBACK CONTROLLER

(71) Applicant: INFINITESIMA LIMITED, Abingdon (GB)

(72) Inventor: Andrew Humphris, Abingdon (GB)

(73) Assignee: INFINITESIMA LIMITED, Abingdon (GB)

( * ) Notice: Subject to any disclaimer, the term of this patent is extended or adjusted under 35 U.S.C. 154(b) by 0 days.

(21) Appl. No.: 15/122,100

(22) PCT Filed: Feb. 27, 2015

(86) PCT No.: PCT/EP2015/054126
§ 371 (c)(1),
(2) Date: Aug. 26, 2016

(87) PCT Pub. No.: WO2015/128458
PCT Pub. Date: Sep. 3, 2015

(65) Prior Publication Data
US 2017/0074901 A1    Mar. 16, 2017

(30) Foreign Application Priority Data
Feb. 28, 2014  (EP) .................................... 14157213

(51) Int. Cl.
*G01Q 10/04* (2010.01)
*G01Q 20/02* (2010.01)
(Continued)

(52) U.S. Cl.
CPC ....... *G01Q 10/065* (2013.01); *G01B 11/0608* (2013.01); *G01Q 10/045* (2013.01); *G01Q 70/10* (2013.01)

(58) Field of Classification Search
CPC .... G01Q 10/065; G01Q 10/045; G01Q 10/00; G01Q 10/04; G01Q 20/02; G01Q 60/32;
(Continued)

(56) References Cited

U.S. PATENT DOCUMENTS 5,196,701 A * 3/1993 Foster ................... B82Y 10/00
250/307
6,530,266 B1 * 3/2003 Adderton ............. G01Q 10/045
73/105

(Continued)

FOREIGN PATENT DOCUMENTS

| EP | 1898204 A1 | 3/2008 |
|---|---|---|
| WO | 2012104625 A1 | 8/2012 |
| WO | 2013114100 A1 | 8/2013 |

OTHER PUBLICATIONS

Butterworth et al., "Architectures for Tracking Control in Atomic Force Microscopes," Proceedings of the 2007 American Control Conference, New York, NY, Jul. 11-13, 2007, pp. 3509-3515.
(Continued)

*Primary Examiner* — David A Vanore
(74) *Attorney, Agent, or Firm* — Hauptman Ham, LLP

(57) ABSTRACT

A probe actuation system has a detection system arranged to measure a position or angle of a probe to generate a detection signal. An illumination system is arranged to illuminate the probe. Varying the illumination of the probe causes the probe to deform which in turn causes the detection signal to vary. A probe controller is arranged to generate a desired value which varies with time. A feedback controller is arranged to vary the illumination of the probe according to the detection signal and the desired value so that the detection signal is driven towards the desired value. The probe controller receives as its inputs a detection signal and a desired value, but unlike conventional feedback systems this desired value varies with time. Such a time-varying
(Continued)

desired value enables the probe to be driven so that it follows a trajectory with a predetermined speed. A position or angle of the probe is measured to generate the detection signal and the desired value represents a desired position or angle of the probe.

14 Claims, 8 Drawing Sheets

(51) Int. Cl.
    *G01N 29/24*             (2006.01)
    *G01Q 10/06*             (2010.01)
    *G01Q 70/10*             (2010.01)
    *G01B 11/06*             (2006.01)

(58) Field of Classification Search
    CPC ...... G01Q 60/34; G01Q 60/38; G01Q 60/363; G01Q 60/40; G01Q 70/06; G01Q 70/10; G01Q 70/14; G01Q 80/00; Y10S 977/863; Y10S 977/881; Y10S 977/849; Y10S 977/85; Y10S 977/851; Y10S 977/86; Y10S 977/861; Y10S 977/869; Y10S 977/871; Y10S 977/875; Y10S 977/947; G01N 21/35; G01N 21/171; G01N 21/1717; G01N 21/3563; G01N 21/3581; G01N 21/552; G01N 29/0663; G01N 29/0681; G01N 29/2418; G01N 29/265
    USPC ........ 850/1, 3, 33, 6, 2, 21, 26, 36, 38, 4, 5, 850/50, 55, 56, 7; 250/307, 339.07
    See application file for complete search history.

(56) References Cited

U.S. PATENT DOCUMENTS

| | | | | |
|---|---|---|---|---|
| 7,036,357 B2* | 5/2006 | Adderton | ............... | B82Y 35/00 73/105 |
| 7,596,989 B2* | 10/2009 | Humphris | .............. | G01Q 60/38 73/105 |
| 7,958,565 B2* | 6/2011 | Ando | ................... | G01Q 10/065 850/33 |
| 8,387,443 B2* | 3/2013 | King | ..................... | G01Q 60/38 73/105 |
| 8,438,927 B2* | 5/2013 | Shekhawat | ........ | G01N 29/0663 73/105 |
| 8,528,110 B2* | 9/2013 | Humphris | .......... | G01B 11/0608 356/28.5 |
| 8,869,602 B2* | 10/2014 | Belkin | ................... | B82Y 35/00 73/105 |
| 9,134,341 B2* | 9/2015 | Prater | .................... | B82Y 35/00 |
| 9,383,386 B2* | 7/2016 | Labuda | .................. | G01Q 60/38 |
| 9,410,982 B2* | 8/2016 | Humphris | ............ | G01Q 10/045 |
| 2009/0313729 A1* | 12/2009 | Ando | ................... | G01Q 10/065 850/33 |
| 2010/0186132 A1* | 7/2010 | Humphris | .............. | G01Q 70/06 850/1 |
| 2011/0247106 A1* | 10/2011 | Humphris | ............ | G01Q 10/065 850/6 |
| 2014/0026263 A1* | 1/2014 | Humphris | .............. | G01Q 10/04 850/3 |
| 2015/0013035 A1* | 1/2015 | Humphris | .............. | G01Q 20/02 850/1 |
| 2015/0034826 A1* | 2/2015 | Prater | .................... | G01N 21/35 250/339.07 |
| 2017/0074901 A1* | 3/2017 | Humphris | ............ | G01Q 10/045 |

OTHER PUBLICATIONS

Clayton et al., "A Review of Feedforward Control Approaches in Nanopositioning for High-Speed SPM", Journal of Dynamic Systems, Measurement, and Control, 131:6, Nov. 2009, pp. 061101-1 through 061101-19.

International Search Report and Written Opinion dated Jun. 2, 2015 International Application No. PCT/EP20151054126.

* cited by examiner

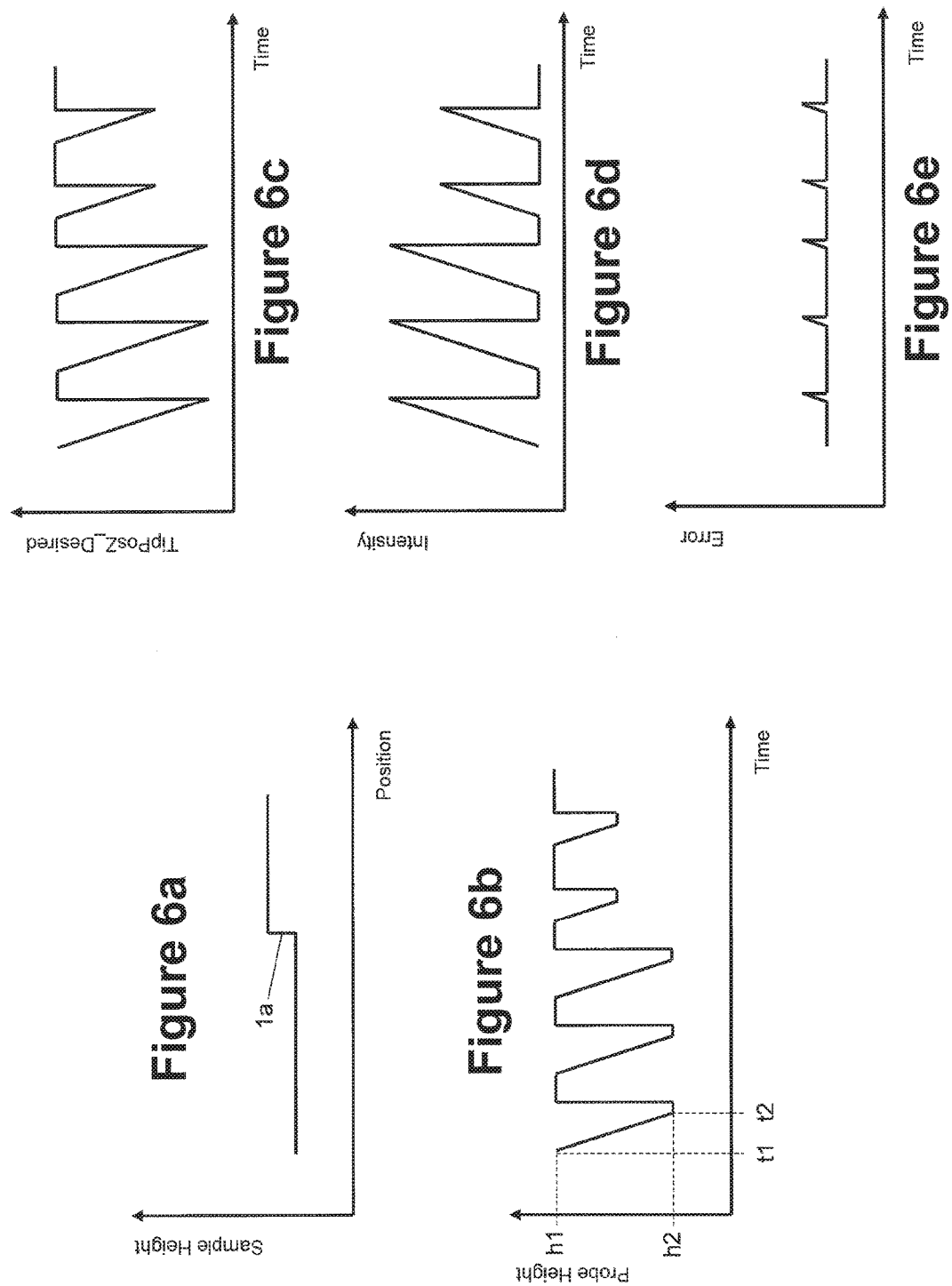

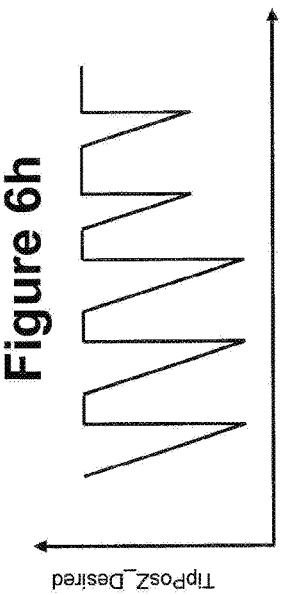
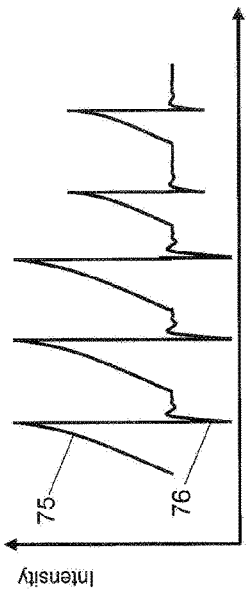
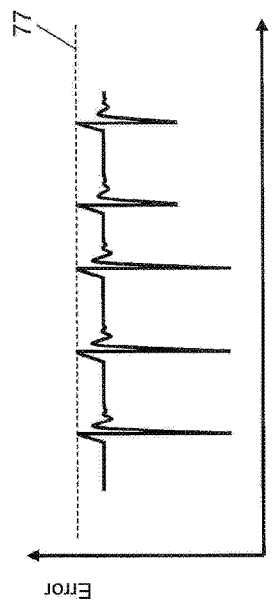
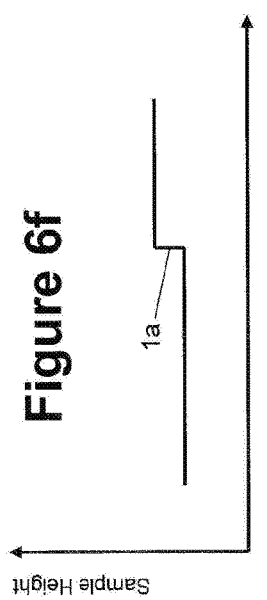
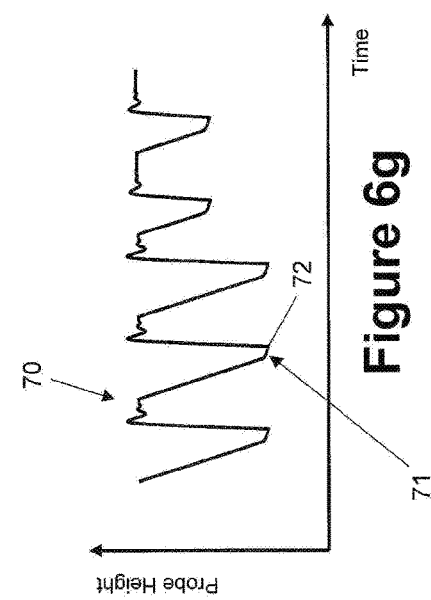

PROBE ACTUATION SYSTEM WITH FEEDBACK CONTROLLER

FIELD OF THE INVENTION

The present invention relates to a probe actuation system and associated method.

BACKGROUND OF THE INVENTION

It is known to employ feedback and feedforward control systems to control the height of a probe in a scanning probe microscope. See for example Pao, L. Y., Butterworth, J. A., and Abramovitch, D. Y., 2007, "Combined Feedforward/Feedback Control of Atomic Force Microscopes," Proceedings of the 2007 American Control Conference, New York, N.Y., July 11-13, pp. 3509-3515, and also Clayton et al., 2009, "A Review of Feedforward Control Approaches in Nanopositioning for High-Speed SPM", *Journal of Dynamic Systems, Measurement, and Control*, 131:6, 061101.

In such conventional control systems, the height of the probe is controlled by a piezo actuator and the angle of the probe is measured by an optical sensor which generates a detection signal. The feedback system receives as inputs the detection signal and a desired value known as a set point. The feedback system then controls the piezo actuator so that the detection signal remains at the set point as a sample is scanned.

EP-A-1898204 describes a scanning probe microscope with a laser which controls displacement of a cantilever. An amplitude detecting circuit determines an amplitude of the cantilever to generate a detected amplitude signal. A feedback circuit subtracts the detected amplitude signal from a reference amplitude signal to generate a deviation signal and a feedback signal. The amplitude of the cantilever is kept constant by the feedback circuit. Thus EP-A-1898204 discloses a probe actuation system according to the pre-amble of claim 1.

WO-A-2012/104625 describes an adaptive mode scanning probe microscope in which the probe is moved repeatedly towards and away from the sample surface, only contacting it intermittently.

SUMMARY OF THE INVENTION

A first aspect of the invention provides a probe actuation system comprising: a detection system arranged to measure a probe to generate a detection signal; an illumination system arranged to illuminate the probe, wherein varying the illumination of the probe causes the probe to deform which in turn causes the detection signal to vary; a probe controller arranged to generate a desired value; and a feedback controller arranged to vary the illumination of the probe according to the detection signal and the desired value so that the detection signal is driven towards the desired value, characterised in that a position or angle of the probe is measured to generate the detection signal and the desired value represents a desired position or angle of the probe.

The first aspect of the invention also provides a method of actuating and measuring a probe, the method comprising: measuring the probe to generate a detection signal; illuminating the probe, wherein varying the illumination of the probe causes the probe to deform which in turn causes the detection signal to vary; generating a desired value; and varying the illumination of the probe according to the detection signal and the desired value so that the detection signal is driven towards the desired value, characterised in that a position or angle of the probe is measured to generate the detection signal and the desired value represents a desired position or angle of the probe.

In EP-A-1898204 the detection signal is analysed to determine an amplitude of the cantilever, and the desired value represents a desired amplitude. In contrast, in an embodiment of the first aspect of the present invention a position or angle of the probe is measured to generate the detection signal, the detection signal is indicative of the position or angle of the probe, and the desired value represents a desired position or angle of the probe, as measured by the detection signal.

For example the desired value may represent a desired position of the probe in a direction perpendicular to the surface of a sample; a desired position of the probe in a direction parallel to the surface of the sample; a desired tilt angle of a cantilever of the probe which varies as the cantilever twists along its length; or a desired bending angle of a cantilever of the probe which varies as the cantilever bends along its length.

The desired value may represent a specific position or angle of the probe, or it may represent some other position or angle of the probe—for instance its average position or angle, or its extreme position or angle in a cyclic motion of the probe.

The desired value may be constant, or it may vary with time.

A second aspect of the present invention provides a probe actuation system probe actuation system comprising: a detection system arranged to measure a probe to generate a detection signal; an illumination system arranged to illuminate the probe, wherein varying the illumination of the probe causes the probe to deform which in turn causes the detection signal to vary; a probe controller arranged to generate a desired value which varies with time; and a feedback controller arranged to vary the illumination of the probe according to the detection signal and the desired value so that the detection signal is driven towards the desired value.

The second aspect of the invention also provides a method of actuating and measuring a probe, the method comprising: measuring the probe to generate a detection signal; illuminating the probe, wherein varying the illumination of the probe causes the probe to deform which in turn causes the detection signal to vary; generating a desired value which varies with time; and varying the illumination of the probe according to the detection signal and the desired value so that the detection signal is driven towards the desired value.

The feedback controller receives as inputs the detection signal and the desired value, but unlike conventional feedback systems this desired value varies with time. Such a time-varying desired value enables the probe to be driven so that it follows a trajectory with a predetermined speed (which may be constant or may vary in some predetermined way for instance to follow a two-dimensional path such as a raster scan path or Lissajous curve, or a one-dimensional path such as a saw-tooth, periodic ramp or sine wave).

Typically the probe controller is arranged to input the desired value into the feedback controller, and the detection system is arranged to input the detection signal into the feedback controller.

The feedback controller may be arranged to vary the illumination of the probe according to a difference between the detection signal and the desired value so that the detection signal is driven towards the desired value. Alternatively the feedback controller may use a model-based feedback control process.

In one embodiment varying the illumination of the probe causes the probe to deform and move towards or away from a sample; the probe controller is arranged to vary the desired value with time so that the probe moves repeatedly towards and away from the sample in a series of cycles; and the system further comprises a surface detector arranged to detect a surface position for each cycle at which the probe interacts with the sample and in response to detection of the surface position prompt the probe controller to modify the desired value so that the probe moves away from the sample. The feedback control system enables the probe to be moved towards the sample along a predetermined trajectory, for instance with a constant speed, which can improve the speed and accuracy of the method. Alternatively the illumination of the probe may cause the probe to deform and move laterally across a sample.

Preferably the feedback controller is arranged to generate an error signal according to a difference between the detection signal and the desired value and to vary the illumination of the probe according to the error signal so that the detection signal is driven towards the desired value; and the surface detector is arranged to receive the error signal as an input from the feedback controller and use the error signal to detect the surface position. Alternatively, where a model-based feedback control process is used, then a model-based feedback controller is arranged to vary the illumination of the probe according to a difference between the detection signal and a predicted detection signal (based on a model of the dynamic behaviour of the probe).

Typically the desired value varies with time in a predetermined manner Optionally the probe controller comprises a memory containing probe control data, and the probe controller is arranged to vary the desired value in accordance with the probe control data contained in the memory. The probe control data typically defines a desired trajectory of the probe—for instance a constant (or otherwise predetermined) speed or a raster scan trajectory.

The detection system is typically arranged to measure a position or angle of the probe to generate the detection signal. For example the detection system may comprise an optical lever which measures an angle of the probe—for example a tilt angle of a cantilever of the probe which varies as the cantilever twists along its length; or a bending angle of a cantilever of the probe which varies as the cantilever bends along its length. More preferably the detection system comprises an illumination system arranged to illuminate the probe with detection radiation, the detection radiation reflecting from the probe to generate a reflected beam; and an interferometer arranged to generate the detection signal in accordance with a path difference between the reflected beam and a reference beam.

Typically the detection signal is directly indicative of the position or angle of the probe, and the desired value represents a desired position or angle of the probe, as measured by the detection signal. This can be contrasted with EP-A-1898204 which uses a reference amplitude signal which is directly indicative of a desired amplitude of the motion of the probe. By way of example, the desired value may represent a desired position of the probe in a direction perpendicular to the surface of a sample; a desired position of the probe in a direction parallel to the surface of the sample; a desired tilt angle of a cantilever of the probe which varies as the cantilever twists along its length; or a desired bending angle of a cantilever of the probe which varies as the cantilever bends along its length. The desired value may represent a specific position or angle of the probe, or it may represent some other position or angle of the probe—for instance its average position or angle, or its extreme position or angle in a cyclic motion of the probe.

The desired value typically changes with time so that the probe moves along a predetermined trajectory towards a sample and/or across a sample.

Typically the desired value varies in a series of cycles, at least some of the cycles being substantially identical.

Typically the probe comprises a cantilever and varying the illumination of the cantilever causes the cantilever to bend.

Typically the probe comprises a tip support structure carrying a probe tip. The tip support structure may comprise a single cantilever arm extending from a cantilever mount with a proximal end carried by the mount and a free distal end remote from the mount which carries the probe tip. In this example the detection system may only have a single detection radiation beam arranged to illuminate the single cantilever arm with detection radiation (if the detection system operates by illuminating the probe) and the illumination system may only have a single illumination beam arranged to illuminate the single cantilever arm. Alternatively the tip support structure may comprise a pair of cantilever arms extending from a cantilever mount, each arm having a proximal end carried by the mount and a free distal end remote from the mount arm, the distal ends of the arms being joined by a bridge which carries the probe tip. In this case the detection system may have a pair of detection radiation beams each arranged to illuminate a respective one of the cantilever arms with detection radiation and the illumination system may similarly have a pair of illumination beams each arranged to illuminate a respective one of the cantilever arms.

Typically the feedback controller is arranged to vary a power of the illumination of the probe according to the detection signal and the desired value so that the detection signal is driven towards the desired value. Thus for example the power of an illumination beam may be varied, or an illumination beam may be turned on and off in a series of pulses to vary the average illumination power being delivered to the probe—the mark/space ratio of the pulses determining the average power. Equivalently, if a single flying spot is used, then the amount of time spent by the flying spot on the probe can be changed in order to vary the average illumination power being delivered to the probe.

The probe actuation system may be part of a scanning probe device in which the probe is moved relative to a sample (or vice versa) by a scanner to generate a relative scanning motion. The probe is operated to interact with the sample during the relative scanning motion, for instance to measure the sample or deposit material on the sample. Typically the desired value varies with time during the relative scanning motion between the probe and the sample.

The probe actuation system may be part of a microscope or other device in which the probe interacts with a sample to measure some property of the sample (for instance its surface topography, or a material property such as elasticity or composition). Alternatively the probe may be used to remove or deposit material on a sample or change a sample in some other way.

BRIEF DESCRIPTION OF THE DRAWINGS

Embodiments of the invention will now be described with reference to the accompanying drawings, in which:

FIGS. 6a-e show a preferred mode of operation in schematic form; and

FIGS. 6f-j show the preferred mode of operation including probe oscillation, sample indentation, and intensity variation due to feedback control.

DETAILED DESCRIPTION OF EMBODIMENT(S)

Figure 1:
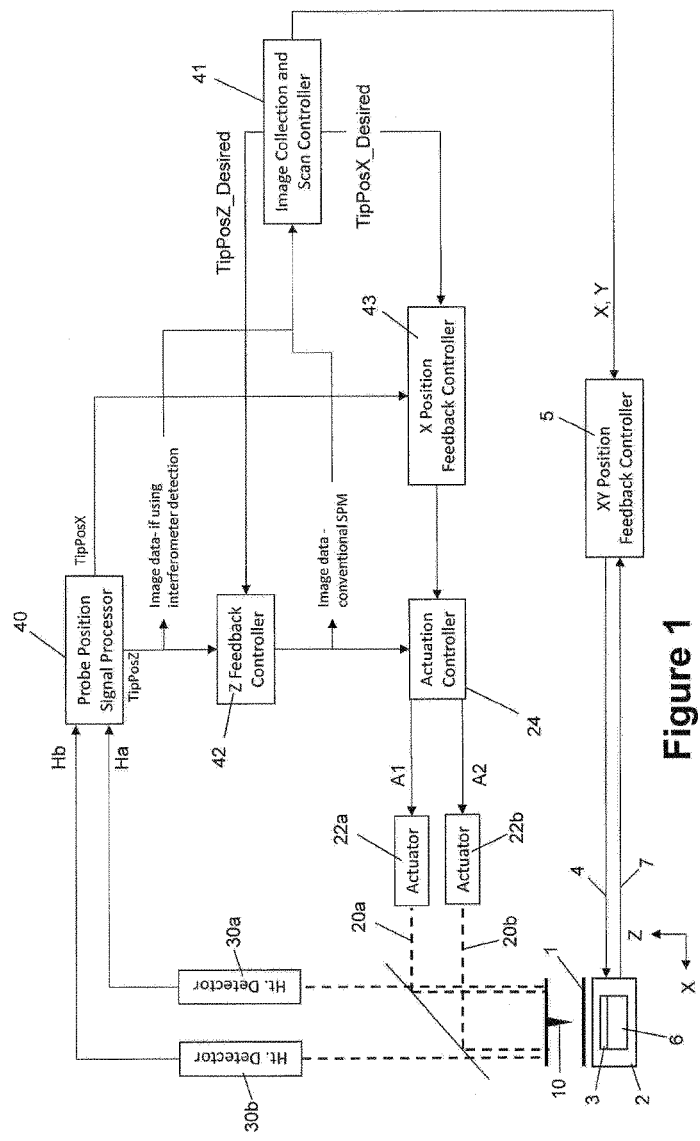
FIG. 1 shows a scanning probe microscope.

FIG. 1 shows a scanning probe microscope for measuring a sample 1 on a stage 2. The stage 2 incorporates a piezoelectric device 3 which can move the stage in a Y-direction (in and out of the plane of FIG. 1) and an X-direction (left and right in FIG. 1) under the control of a control line 4 from an XY position feedback controller 5. The stage 2 also incorporates a sensor 6 such as an interferometer, capacitance sensor or strain gauge sensor for sensing the X and Y position of the stage. The sensor 6 outputs the X and Y positions on a sensing line 7 to the XY position feedback controller 5.

Figure 3:
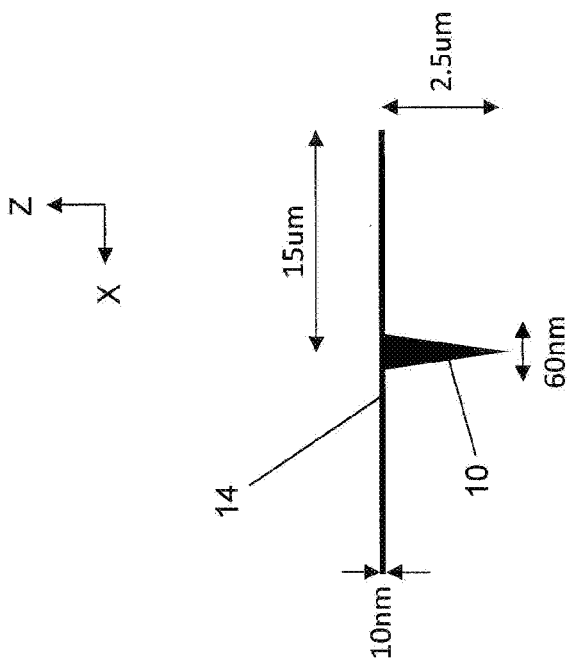
FIG. 3 is an end view of the probe of FIG. 2.
Figure 2:
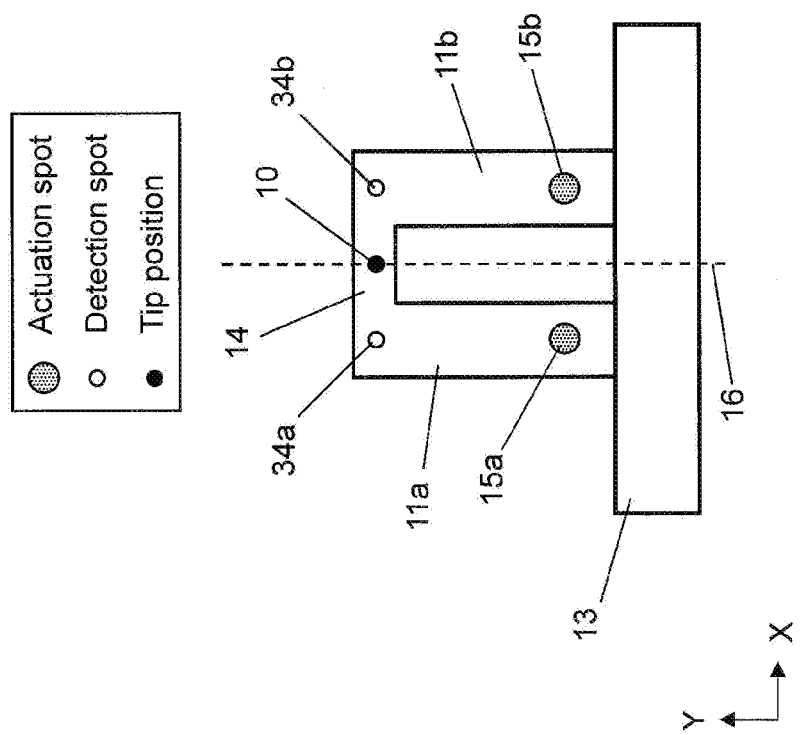
FIG. 2 is a plan view of the probe used in the microscope of FIG. 1.

A probe with a probe tip 10 shown in FIGS. 2 and 3 is mounted above the stage. The probe tip 10 comprises a conical or pyramidal structure that tapers from its base to a point at its distal end that is its closest point of interaction with the sample 1. The probe tip 10 is shown with its axis extending vertically (that is, in the −Z direction based on the frame of reference shown in FIG. 1). The probe tip 10 is carried by a tip support structure comprising first and second cantilever arms 11a,b shown in FIG. 2. Each cantilever arm extends from a cantilever mount 13 with a proximal end carried by the mount and a free distal end remote from the mount. The distal ends of the arms are joined by a bridge 14 which carries the probe tip 10 on its underside.

The arms 11a,b are thermal bimorph structures composed of two (or more) materials, with differing thermal expansions—typically a silicon or silicon nitride base with a gold or aluminium coating. The coating extends the length of the arm and covers the reverse side from the tip 10. An illumination system (in the form of a pair of lasers 22a,b) under the control of an actuation controller 24 is arranged to illuminate the arms on their coated side with respective intensity-modulated first and second radiation spots 15a,b at respective first and second actuation locations.

The arms 11a,b and the bridge 14 are formed from a monolithic structure with uniform thickness. For example the monolithic structure may be formed by selectively etching a thin film of $SiO_2$ or $SiN_4$ as described in Albrecht T., Akamine, S., Carver, T. E., Quate, C. F. J., Microfabrication of cantilever styli for the atomic force microscope, Vac. Sci. Technol. A 1990, 8, 3386 (hereinafter referred to as "Albrecht et al."). The tip 10 may be formed integrally with the arms 11a,b and bridge 14, as described in Albrecht et al., it may be formed by an additive process such as electron beam deposition, or it may be formed separately and attached by adhesive or some other attachment method.

Returning to FIG. 1, the radiation spots 15a,b are generated by respective actuation beams 20a,b which are output from the lasers 22a,b. The actuation controller 24 outputs a first control signal A1 to the laser 22a which controls the illumination power of its laser beam 20a accordingly, and similarly the actuation controller 24 outputs a second control signal A2 to the laser 22b which controls the illumination power of its laser beam 20b accordingly. The two different control signals A1 and A2 independently control the illumination powers at the two actuation locations in order to control the height and tilt angle of the probe tip 10 as described in further detail below.

The tip support structure has a plane of symmetry 16 passing through the probe tip 10, and the spots 15a,b at the first and second actuation locations are symmetrically positioned on opposite sides of the plane of symmetry 16.

The wavelength of the actuation beams is selected for good absorption by the coating, so that each radiation spot heats the coating of its respective arm and the arm bends along its length and moves the probe tip 10. In this example the coating is on the reverse side from the sample so each arm bends towards the sample when heated, but alternatively the coating may be on the same side as the sample so each arm bends away from the sample when heated. In a further alternative embodiment the coatings for the two arms may be on opposite sides: that is, the coating on arm 11a may be on its upper side (the reverse side from the sample) so the arm 11a bends towards the sample when heated, and the coating on arm 11b is on its lower side (the same side as the sample) so the arm 11b bends in an opposite direction away from the sample when heated.

A pair of interferometer height detectors 30a,b are arranged to measure heights of the probe at two spaced apart detection locations via detection spots 34a,b at first and second detection locations symmetrically positioned on opposite sides of the plane of symmetry 16. The detectors 30a,b are shown schematically in FIG. 1, and FIG. 4 shows one of the interferometers 30a in more detail (the other interferometer 30b being identical).

Figure 4:
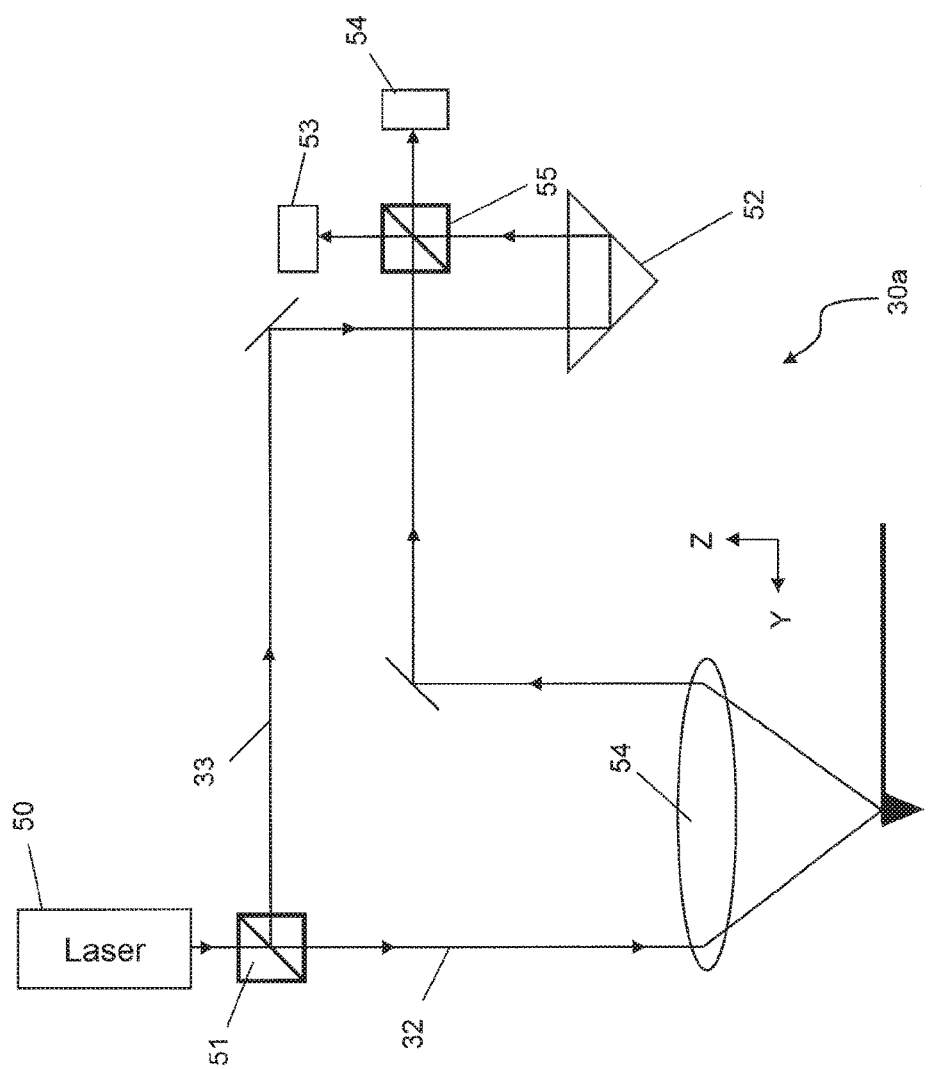
FIG. 4 shows an interferometer detection system.

Referring to FIG. 4—light from a source 50 is split by a beam splitter 51 into a detection beam 32 and a reference beam 33. The detection beam 32 is focused by an objective lens 54 onto the back of the probe. After reflection from the probe, the reflected detection beam is directed to a beam splitter 55. The reference beam 33 is directed to the beam splitter 55 via a retro-reflector 52.

The beam splitter 55 has an energy absorbing coating and splits both detection and reference beams to produce first and second interferograms with a relative phase shift of 90 degrees. The two interferograms are detected respectively at photodetectors 53, 54.

Ideally, the photodetector signals are complementary sine and cosine signals with a phase difference of 90 degrees. Further, they should have no dc offset, have equal amplitudes and only depend on the position of the cantilever and wavelength of the laser 10. Known methods are used to monitor the outputs of the photodetectors 53, 54 while changing the optical path difference in order to determine and to apply corrections for errors arising as a result of the two photodetector signals not being perfectly harmonic, with equal amplitude and in phase quadrature. Similarly, dc offset levels are also corrected in accordance with methods known in the art.

These photodetector signals are suitable for use with a conventional interferometer reversible fringe counting apparatus and fringe subdividing apparatus, which may be provided as dedicated hardware or as a programmed computer. Phase quadrature fringe counting apparatus is capable of measuring displacements in the position of the cantilever to an accuracy of $\lambda/8$. That is, to 66 nm for 532 nm light.

Known fringe subdividing techniques, based on the arc tangent of the signals, permit an improvement in accuracy to the nanometer scale or less.

Interferometric methods of extracting the path difference between two coherent beams are well known in the art and so will not be described in any further detail.

The interferometer described herein is one example of a homodyne system. The particular system described offers a number of advantages to this application. The use of two phase quadrature interferograms enables the measurement of cantilever displacement over multiple fringes, and hence over a large displacement range. The use of a phase-shifting coating on the beamsplitter 55 reduces the interferometer's sensitivity to polarisation effects, for example arising from changes in polarisation as the detection beam is reflected from the cantilever. Examples of an interferometer based on these principles are described in U.S. Pat. No. 6,678,056 and WO2010/067129. Alternative interferometer systems capable of measuring a change in optical path length may also be employed with this invention, for example, a homodyne interferometer could be implemented using polarization methods to generate the two phase quadrature interferograms or a heterodyne interferometer implemented by using a dual frequency laser. A suitable homodyne polarisation interferometer is described in EP 1 892 727 and a suitable heterodyne interferometer is described in U.S. Pat. No. 5,144,150 which could be adapted for use with this invention.

Thus measured height signals Ha, Hb for each detection location are generated by the height detectors 30a,b in accordance with a path difference between the detection beam 32 reflected from the detection location and the reference beam 33. The radiation spots generated by the detection beams 32 at the two detection locations are labelled 34a,b in FIG. 2.

Returning to FIG. 1, the measured height signals Ha, Hb are input into a probe position signal processor 40 which generates a probe tip height signal TipPosZ=(Ha+Hb)/2 which is indicative of a height of the tip of the probe, a tilt signal Tipα=atan((Hb−Ha)/L) which is indicative of a tilt angle of the probe, where L is the distance between the detection spots 34a,b, and a probe tip lateral position signal TipPosX=D*((Hb−Ha)/L) where D is the length of the probe tip 10. This calculation of TipPosX assumes that the tip is halfway between the two detection spots 34a,b. Other geometries are possible but will affect the calculation of TipPosX.

TipPosZ indicates a measured position of the probe in a direction (Z) perpendicular to the surface of the sample and TipPosX indicates a measured position of the probe in a lateral direction (X) parallel to the surface of the sample.

Note that these signals TipPosZ, TipPosX and Tipα only approximately indicate the height, X-position and tilt angles for the probe, but this is an approximation which is reasonably accurate for small changes in height, X-position and tilt angle. When the probe is illuminated simultaneously by both actuation spots 15a,b with the same illumination power, the arms 11a,b bend down by the same amount so that the probe moves towards the sample (in the ZY plane—essentially in the Z direction for small angles) and causes a change in the height signals Ha, Hb and TipPosZ, but essentially no change in Tipα or TipPosX.

When the probe is illuminated by the spot 15a with a greater illumination power than the other spot 15b, then the probe tilts clockwise (from the viewpoint of FIG. 3) and causes a negative change in the tilt signal. Similarly, when the probe is illuminated by the spot 15b with a greater power than the other spot 15a, then the probe tilts anti-clockwise (from the viewpoint of FIG. 3) and causes a positive change in the tilt signal. Note that the motion of the probe will not be a pure rotation, so it will also cause a certain amount of change in the probe height and hence TipPosZ, but this change of height can be assumed to be negligible for small angles of tilt and can be compensated for by introducing an additional height adjustment.

Returning to FIG. 1, the height signal TipPosZ is output to a Z position feedback controller 42 which provides a cantilever beam Z-control signal to the actuation controller 24. Similarly the lateral position signal TipPosX is output to an X position feedback controller 43 which provides a cantilever beam X-control signal to the actuation controller 24.

An image may be generated in one of two ways. In one example (using interferometer detection) the height signal TipPosZ is output to an image collection and scan controller 41 which compiles an image based on variation of TipPosZ over the course of a scan. In another example (similar to a conventional Scanning Probe Microscope (SPM)) the cantilever beam Z-control signal is instead output to the controller 41 for image compilation.

Overall control of the process is co-ordinated by the controllers 41-43 described above. The controller 41 is arranged to generate a desired value (TipPosZ_Desired) for the height signal TipPosZ, and a desired value (TipPosX_Desired) for the lateral position signal TipPosX. The desired values (TipPosZ_Desired, TipPosX_Desired) effectively represent desired positions of the probe—TipPosZ_Desired representing a desired position of the probe in a direction (Z) perpendicular to the surface of the sample and TipPosX_Desired representing a desired position of the probe in a direction (X) parallel to the surface of the sample. Each one of these desired values (TipPosZ_Desired, TipPosX_Desired) varies with time. If the probe is to be moved to the desired height value TipPosZ_Desired—or equivalently a desired interaction level with the sample—and/or the desired lateral position TipPosX_Desired then the controller 41 inputs TipPosX_Desired and TipPosZ_Desired into the feedback controllers 42, 43. The Z feedback controller 42 monitors the height signal TipPosZ compared with TipPosZ_Desired and determines the cantilever beam Z-control signal which it outputs to the actuation controller 24. When the cantilever beam Z-control signal changes by ΔZ then the actuation controller 24 changes the illumination powers at both actuation locations according to ΔZ so that the measured height signal TipPosZ is driven towards the desired height value TipPosZ_Desired. Similarly the X feedback controller 43 monitors the tilt signal TipPosX compared with TipPosX_Desired and determines the cantilever beam X-control signal which it outputs to the actuation controller 24. When the cantilever beam X-control signal changes by ΔX then the actuation controller 24 changes the difference between illumination powers at the actuation locations according to ΔX so that the measured lateral position signal TipPosX is driven towards the desired lateral position TipPosX_Desired.

When the probe is to be moved in both Z and X the actuation controller 24 causes the laser 22a to change its intensity A1 by an amount (ΔZ+ΔX/2) and the laser 22b to change its intensity A2 by an amount (ΔZ−ΔX/2).

Note that rather than having two independent X and Z feedback controllers 42, 43, the two feedback controllers 42, 43 may be integrated into a single feedback control unit which controls both the X position and the Z position.

Integrating into a single feedback controller may be preferred if compensation for coupling between X and Z is required.

A preferred mode of operation will now be described with reference to FIGS. 5a and 6a-j. FIG. 6a shows the profile of the sample 1 with a step 1a. The controller 41 incorporates a waveform generator 41b shown in FIG. 5a which generates a waveform shown in FIG. 6c. As noted above, the desired value TipPosZ_Desired shown in FIG. 6c varies with time. The waveform causes the probe to follow a cyclic back and forth motion set at a frequency that is lower than the resonant frequency of the probe. The waveform may be periodic as in FIG. 6c or aperiodic, provided that it repeatedly brings the tip towards and then away from the sample surface as shown in FIG. 6b. In other words, the cycles of the back and forth motion of the tip may be spaced apart in time by a constant time period, or they may be spaced apart by a time period which is not constant—for instance in order to sample different points spaced apart irregular intervals across the surface of the sample rather than sampling a regularly spaced grid of pixels.

During the course of a measurement the probe is moved towards the sample surface at a constant speed until the surface is detected by a surface detector 41a (described in further detail below) at which point the probe is retracted and the height signal TipPosZ is recorded at the point of surface detection. An image (i.e. a map of measurements) of the surface height is then created by repeating this process while moving the sample laterally under control of the piezoelectric device 3, generally following a raster pattern although any x,y sequence could be followed.

The operation of the feedback controllers 42, 43 will now be described with reference to the mode of operation shown in FIGS. 6a-j. If the probe is to be moved to a desired height value TipPosZ_Desired and/or a desired lateral position TipPosX_Desired then the controller 41 inputs TipPosX_Desired and TipPosZ_Desired into the feedback controllers 42, 43.

In this example TipPosZ_Desired varies back and forth with time as shown in FIG. 6c, decreasing at a constant rate as the probe moves towards the sample at a constant speed. The scan controller 41 comprises a memory 41c containing probe height control data, and is arranged to generate TipPosZ_Desired in accordance with this probe height control data and the output of the surface detector 41a. The probe height control data defines the required back and forth motion of the probe in the Z direction—for instance defining the speed of approach towards the sample, the maximum amplitude of motion and the repeat period of the motion. Alternatively probe height control data may define an algorithm which enables TipPosZ_Desired to be calculated on the fly during the scanning of the sample. In either case the probe height control data is predefined in the sense that it has been stored in the memory 41c before the performance of the method, rather than being generated on the fly during the scanning of the sample.

In order to ensure such a constant speed of approach towards the sample, the Z feedback controller 42 monitors the height signal TipPosZ compared with the time-varying signal TipPosZ_Desired and determines the difference which it outputs as an error signal (shown in FIG. 6e) to a proportional-integral-derivative (PID) feedback controller 42a. The PID feedback controller generates the cantilever beam Z-control signal in accordance with the error signal which it outputs to the actuation controller 24. Then the actuation controller 24 changes the illumination powers at both actuation locations according to any change ΔZ in the cantilever beam Z-control signal so that the measured height signal TipPosZ is driven towards the desired height value TipPosZ_desired. The variation in illumination power is shown in FIG. 6d.

Figure 5A:
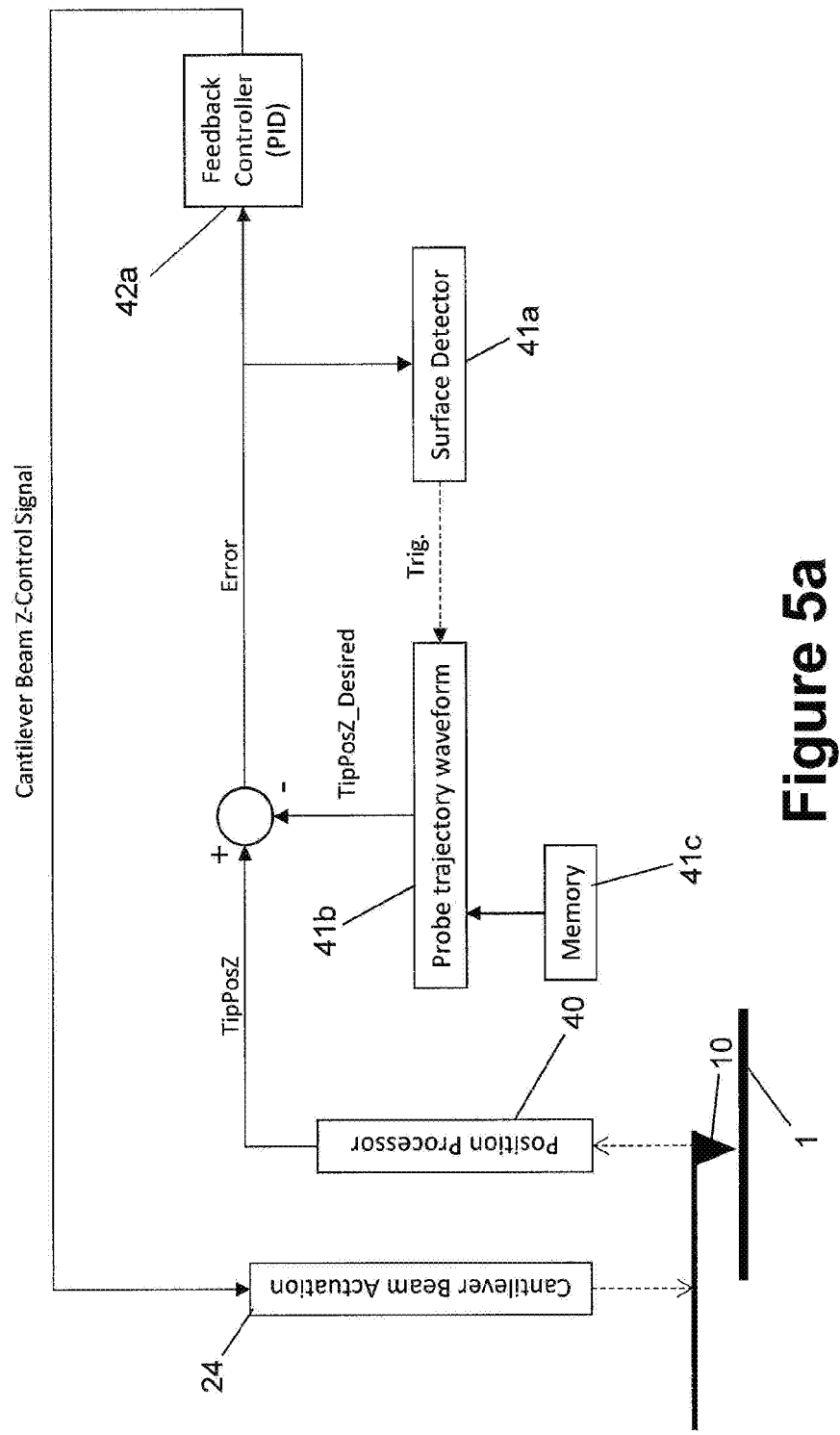
FIG. 5a shows further details of the control system in the microscope of FIG. 1.
Figure 5B:
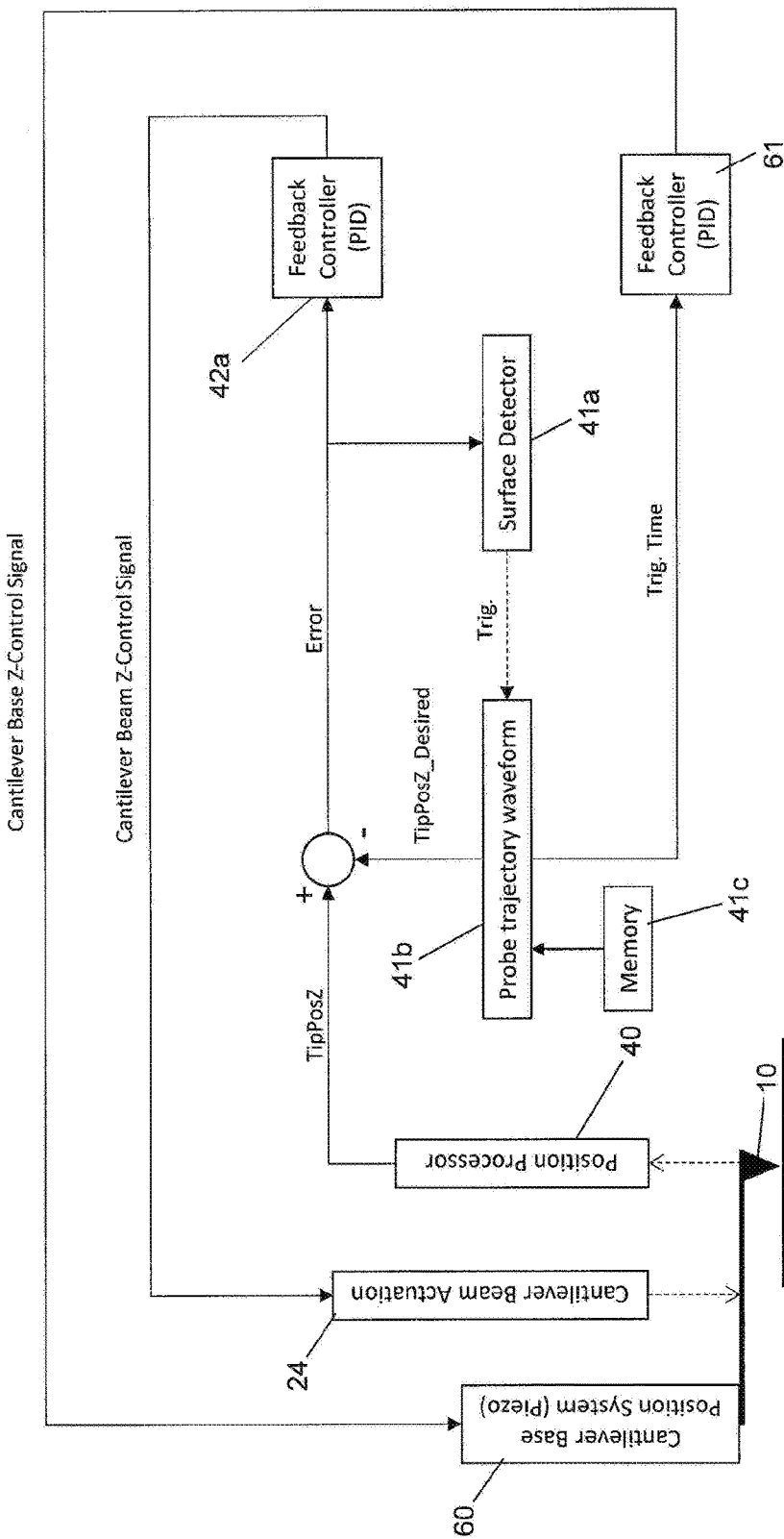
FIG. 5b shows an alternative feedback control system.
Figure 5C:
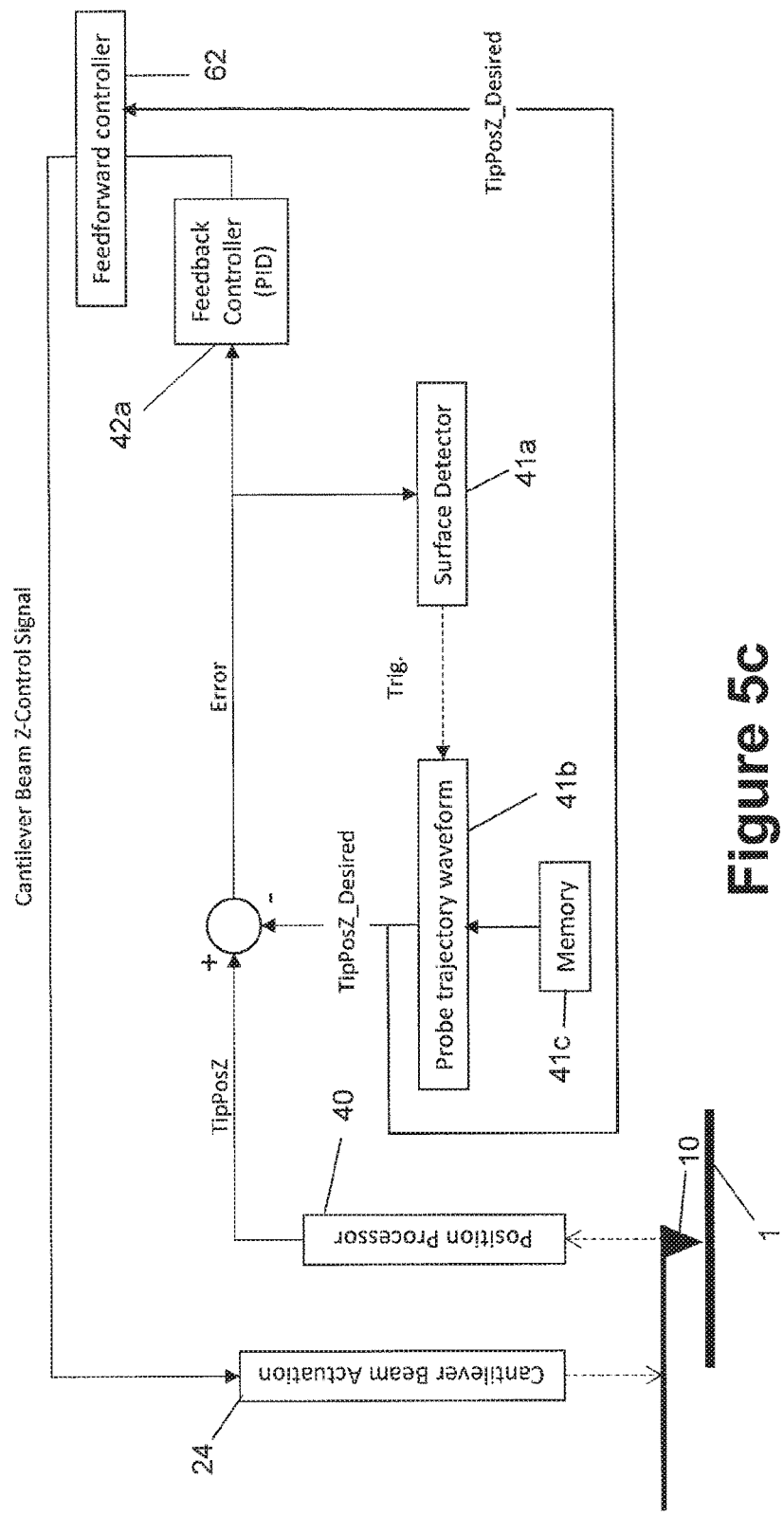
FIG. 5c shows a feedback control system combined with feedforward control.

Optionally a z positioning system (not shown) may control the height of the cantilever mount 13 or the sample 1 and be operated to maintain the probe cyclic amplitude at a set average level, where the "probe cyclic amplitude" is the height difference for each cycle between the fully retracted position and the point of surface detection. An example of this optional arrangement is shown in FIG. 5b which shows an alternative embodiment which is similar to FIG. 5a except it also includes a piezoelectric base positioning system 60 which can move the cantilever mount 13 up and down in the vertical (Z) direction by a larger amount than the photothermal actuation system 22a, 22b, 24. Typically the positioning system 60 can move the cantilever mount 13 by a maximum distance of the order of 5 μm ($5*10^{-6}$ m) which is about ten times more than the maximum range of movement provided by the photothermal actuation system 22a, 22b, 24. An additional PID feedback controller 61 controls the Z position of the cantilever mount 13 to maintain the probe within the range of the photothermal actuation system 22a, 22b, 24. FIG. 5c shows a further alternative embodiment which is similar to FIG. 5a except it also includes a feedforward controller 62 as well as a feedback controller. Note that FIG. 5c is only schematic and the loop connections could be more complex. The feedforward controller 62 provides a form of model based feedback, in that feedforward uses an inverse of the probe/tip dynamic transfer function to extend the overall frequency response. This could address thermal, optical and mechanical dynamics. The feedforward approach is known, for instance in Pao, L. Y., Butterworth, J. A., and Abramovitch, D. Y., 2007, "Combined Feedforward/Feedback Control of Atomic Force Microscopes," Proceedings of the 2007 American Control Conference, New York, N.Y., July 11-13, pp. 3509-3515, and also in Clayton et al., 2009, "A Review of Feedforward Control Approaches in Nanopositioning for High-Speed SPM", *Journal of Dynamic Systems, Measurement, and Control*, 131:6, 061101.

The surface detector 41a provides an indication of the point in the cycle at which the probe tip interacts with the sample surface. In the embodiments of FIGS. 5a-c the input to the surface detector 41a is the error signal (FIG. 6e) from the Z feedback controller, and the surface position is extracted by the surface detector 41a from the point within each cycle at which the error signal exceeds a threshold for a set period of time.

In another example (not shown) the input to the surface detector 41a could be the signal TipPosZ from the position processor 40. The probe velocity, or equivalently rate of change of the height signal, will fall as the tip encounters and begins to interact with the surface. An indication of the surface position is therefore extracted from the point within each cycle at which the rate of change of TipPosZ falls below a threshold for a set period of time. Alternatively the probe could be oscillated at resonance with a small amplitude and high frequency to provide a "dithering" motion which is superimposed on the larger amplitude and lower frequency waveform shown in FIG. 6c. The surface detector monitors the phase, amplitude or frequency of this dithering motion within the signal TipPosZ and detects that the probe is at a surface position when the phase, amplitude or frequency changes significantly. In this case the high frequency dithering motion is filtered from the signal TipPosZ to generate an average TipPosZ signal, and this average TipPosZ signal is input into the feedback controller and compared with the time-varying signal TipPosZ_Desired to generate the error signal. Alternatively, rather than using an average TipPosZ signal, the maximum or minimum points of the dithering motion may be input into the feedback controller and compared with the time-varying signal TipPosZ_Desired to generate the error signal.

Once the point of surface detection is determined, the surface detection unit 41a sends a trigger signal to the waveform generator 41b. In response, the waveform generator 41b modifies its output (TipPosZ_Desired) in order to retract the tip away from the sample.

The value of TipPosZ at the time of surface detection gives an indication of the height of the probe at which it interacts with the surface within each period of a probe cycle. That is, it provides a measure of surface height at the probe's x,y position that can be used to construct an image. Each data point, representing a measured surface height, is mapped to the scan x,y position and so forms a point or pixel on the image. Optionally multiple measurements of surface height may be used to form each pixel.

The image can be based on the height h2 (shown in FIG. 6b) of the probe at which it detects or interacts with the surface in each period of probe cycle. Alternatively, it could be based on the time t241 (also shown in FIG. 6b) which the probe takes to reach the surface position from its fully retracted position. Since the height h1 of the fully retracted position and the rate of approach v of the probe tip towards the sample are known, the height h2 can be calculated as: h2=h1−v1*(t2−t1).

The height signal TipPosZ can also be monitored over a period of time during which the probe is interacting with the sample to generate elasticity data or other material data indicative of a material property of sample, and that material data used to form an image. This is illustrated in FIG. 6g which is a more realistic representation of the probe height during the traversal of the step 1a, this time including oscillation and ringing down of the probe during the retraction phase 70, and a gradual reduction in tip height as it becomes indented into the sample at 71 before it is retracted at 72. FIG. 6i is similar to FIG. 6d but includes the intensity variation caused by the Z-feedback controller 42 responding to the oscillation of the probe. Specifically the intensity variation 75 during the approach phase is not linear (unlike FIG. 6d) and the intensity drops close to zero at 76 in order to rapidly retract the probe. FIG. 6j also shows oscillations in the error signal, and the value of the trigger threshold 77 used by the surface detector 41a.

An image of the sample is typically created by moving the tip relative to the sample in a raster pattern. The required lateral (X) position of the probe relative to the sample is a "triangle-wave" back and forth motion to achieve a fast raster scan with constant velocity and an instantaneous reversal of direction at the opposite edges of the scan area. The fundamental frequency of this scanning motion is achieved by the piezoelectric device 3 which generates a sinusoidal movement of the stage at the necessary frequency in the X-direction. The higher frequency X-motion is driven by the lasers 22a,b which tilt the probe back and forth. Therefore TipPosX_Desired varies periodically over time as the probe raster scans across the sample. The scan controller 41 comprises a memory (not shown) containing probe lateral position control data, and it is arranged to vary TipPosX_Desired in accordance with this probe lateral position control data. So just as the desired value TipPosZ_Desired varies with time as shown in FIG. 6c, the desired value TipPosX_Desired also varies with time (as a triangle wave).

The X feedback controller 43 has a similar mode of operation to the Z feedback controller shown in FIG. 5 and generates a cantilever beam X-control signal which is output to the actuation controller 24. The actuation controller 24 then changes the difference between illumination powers at the actuation locations so that the measured lateral position signal TipPosX is driven towards the desired lateral position TipPosX_Desired.

In the embodiments of the invention described above, the illumination powers A1, A2 are changed by modulating the intensity of the actuation laser 22a,b. Thus in this case the instantaneous heating power of the actuation spots change to move the probe. In an alternative embodiment the intensity of the lasers 22a,b, may be kept constant but turned on and off in a series of pulses to vary the average illumination power being delivered to the probe—the mark/space ratio of the pulses determining the average power. Equivalently, if a single flying spot is used, then the amount of time spent by the flying spot at each actuation location can be changed in order to independently control the average illumination power being delivered to each actuation location.

The microscopes of FIGS. 1-5 can be operated in a number of different imaging modes including, but not limited to, the imaging mode shown in FIG. 6. In all cases a lateral (XY) raster scanning motion is generated between the probe tip 10 and the sample 1 by moving the sample 1 by operation of the XY position feedback controller 5. In a contact imaging mode, the probe tip 10 remains in contact with the sample at all times, and its measured height TipPosZ is used by the image collection and scan controller 41 to compile an image of the topographical shape of the sample surface. In the intermittent contact imaging mode described above with reference to FIG. 6 (as described in further detail for example in WO-A-2012/104625, the contents of which are incorporated herein by reference) the probe is moved repeatedly towards and away from the sample surface, only contacting it intermittently.

In the examples above the controller 41 inputs TipPosX_Desired into the feedback controller 43, so the desired value represents a desired lateral position of the probe as measured by TipPosX. Alternatively the controller 41 may input a desired value Tipα_Desired into the feedback controller 43, so the desired value represents a desired tilt angle of the probe as measured by Tipα.

Although the invention has been described above with reference to one or more preferred embodiments, it will be appreciated that various changes or modifications may be made without departing from the scope of the invention as defined in the appended claims.

The invention claimed is:

1. A probe actuation system comprising: a detection system arranged to measure a probe to generate a detection signal; an illumination system arranged to illuminate the probe, wherein varying the illumination of the probe causes the probe to deform which in turn causes the detection signal to vary; and wherein the system is configured to vary the illumination of the probe according to the detection signal and a desired value so that the detection signal is driven towards the desired value, characterised in that a position or angle of the probe is measured to generate the detection signal and the desired value represents a desired position or angle of the probe, wherein the illumination system is arranged to illuminate the probe with detection radiation, the detection radiation reflecting from the probe to generate a reflected beam; and the probe actuation system also includes an interferometer arranged to generate the detection signal in accordance with a path difference between the reflected beam and a reference beam.

2. A probe actuation system comprising: a detection system arranged to measure a probe to generate a detection signal; an illumination system arranged to illuminate the probe, wherein varying the illumination of the probe causes the probe to deform which in turn causes the detection signal to vary; wherein the system is configured to generate a desired value which varies with time; and wherein the system is configured to vary the illumination of the probe according to the detection signal and the desired value so that the detection signal is driven towards the desired value, wherein the illumination system is arranged to illuminate the probe with detection radiation, the detection radiation reflecting from the probe to generate a reflected beam; and the probe actuation system also includes an interferometer arranged to generate the detection signal in accordance with a path difference between the reflected beam and a reference beam.

3. The system of claim 1 wherein the system comprises a memory containing probe control data, and the system is arranged to vary the desired value in accordance with the probe control data contained in the memory.

4. The system of claim 2 wherein the detection system is arranged to measure a position or angle of the probe to generate the detection signal.

5. A scanning probe device comprising a probe, an actuation system according to claim 1 for actuating the probe; and a scanner for moving the probe relative to a sample (or vice versa) to generate a relative scanning motion.

6. The device of claim 5 wherein the probe controller is arranged so that the desired value varies with time during the relative scanning motion.

7. A method of actuating and measuring a probe, the method comprising: measuring the probe to generate a detection signal; illuminating the probe, wherein varying the illumination of the probe causes the probe to deform which in turn causes the detection signal to vary; generating a desired value; and varying the illumination of the probe according to the detection signal and the desired value so that the detection signal is driven towards the desired value, characterised in that a position or angle of the probe is measured to generate the detection signal and the desired value represents a desired position or angle of the probe, wherein the method further comprises varying the illumination of the probe based on a feedback process utilizing as inputs to the process the detection signal and the desired value.

8. A method of actuating and measuring a probe, the method comprising: measuring the probe to generate a detection signal; illuminating the probe, wherein varying the illumination of the probe causes the probe to deform which in turn causes the detection signal to vary; generating a desired value which varies with time; and varying the illumination of the probe according to the detection signal and the desired value so that the detection signal is driven towards the desired value, wherein the method further comprises varying the illumination of the probe based on a feedback process utilizing as inputs to the process the detection signal and the desired value.

9. The method of claim 8 wherein a position or angle of the probe is measured to generate the detection signal.

10. The method of claim 9 wherein the desired value represents a desired position or angle of the probe.

11. A method of actuating and measuring a probe, the method comprising: measuring the probe to generate a detection signal; illuminating the probe, wherein varying the illumination of the probe causes the probe to deform which in turn causes the detection signal to vary; generating a desired value; and varying the illumination of the probe according to the detection signal and the desired value so that the detection signal is driven towards the desired value, characterised in that a position or angle of the probe is measured to generate the detection signal and the desired value represents a desired position or angle of the probe, wherein the method further comprises varying the desired value in accordance with probe control data contained in a memory.

12. A method of actuating and measuring a probe, the method comprising: measuring the probe to generate a detection signal; illuminating the probe, wherein varying the illumination of the probe causes the probe to deform which in turn causes the detection signal to vary; generating a desired value; and varying the illumination of the probe according to the detection signal and the desired value so that the detection signal is driven towards the desired value, characterised in that a position or angle of the probe is measured to generate the detection signal and the desired value represents a desired position or angle of the probe, wherein the desired value changes with time in a predetermined manner so that the probe moves at a predetermined speed, which may be constant or varying with time.

13. A method of actuating and measuring a probe, the method comprising: measuring the probe to generate a detection signal; illuminating the probe, wherein varying the illumination of the probe causes the probe to deform which in turn causes the detection signal to vary; generating a desired value; and varying the illumination of the probe according to the detection signal and the desired value so that the detection signal is driven towards the desired value, characterised in that a position or angle of the probe is measured to generate the detection signal and the desired value represents a desired position or angle of the probe, wherein varying the illumination of the probe causes the probe to deform and move towards or away from a sample; the desired value varies with time so that the probe moves repeatedly towards and away from the sample in a series of cycles; and the method further comprises detecting a surface position for each cycle at which the probe interacts with the sample and in response to detection of the surface position modifying the desired value so that the probe moves away from the sample.

14. The method of claim 7 further comprising and moving the probe relative to the sample (or vice versa) to generate a relative scanning motion, and operating the probe to interact with the sample during the relative scanning motion.

* * * * *